(12) United States Patent
Miura et al.

(10) Patent No.: US 6,310,756 B1
(45) Date of Patent: Oct. 30, 2001

(54) CAPACITOR

(75) Inventors: Teruhisa Miura, Uji; Makoto Fujiwara, Kouga-gun; Masafumi Okamoto, Uji; Haruhiko Handa, Yamatotakada; Takumi Yamaguchi, Katano; Toshiyuki Hata, Uji, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/517,311

(22) Filed: Mar. 2, 2000

(30) Foreign Application Priority Data

Mar. 2, 1999 (JP) .................................................. 11-054090
May 20, 1999 (JP) .................................................. 11-139753

(51) Int. Cl.$^7$ ........................................................ H01G 4/00
(52) U.S. Cl. ......................... 361/301.3; 361/517; 361/535
(58) Field of Search ..................................... 361/272, 511, 361/512, 517–521, 535–539, 534; 29/25–42

(56) References Cited

U.S. PATENT DOCUMENTS

| | | | |
|---|---|---|---|
| 3,648,337 | * | 3/1972 | Greskamp et al. ................. 29/25.42 |
| 4,760,494 | * | 7/1988 | Crum ................................... 361/272 |
| 5,381,301 | * | 1/1995 | Hudis ................................ 361/275.2 |
| 5,847,919 | * | 12/1998 | Shimizu et al. ..................... 361/517 |

* cited by examiner

Primary Examiner—Anthony Dinkins
(74) Attorney, Agent, or Firm—Parkhurst & Wendel, L.L.P.

(57) ABSTRACT

A capacitor of the present invention includes a hollow capacitor element prepared by winding a pair of flat electrodes with a separator sandwiched in-between in such a way that both ends of each respective electrode protrude in a direction opposite to each other, an electrode connecting member connected to each respective end surface of the electrode of the above, by metal plasma-spraying, welding, soldering and adhesion using a conductive adhesive, and a terminal for external connection is connected to the electrode connecting member. A cylindrical metal case contains the capacitor element together with a driving electrolyte and a sealing plate closing the opening of the metal case. A reduction in resistance of electrodes is made possible and, in addition, the capacitor can be made smaller in size and the number of the components can be decreased.

44 Claims, 14 Drawing Sheets

CAPACITOR

FIELD OF THE INVENTION

The present invention relates to a capacitor for use in various kinds of electronic equipment.

BACKGROUND OF THE INVENTION

A conventional capacitor of this kind is described with reference to FIG. 17 and FIG. 18.

As FIG. 18 shows, a capacitor element 40 comprises a pair of electrode plates 37a and 38b, lead tabs 38a to 38d connected to the electrode plates 37a and 37b and a separator 39. The pair of electrode plates 37a and 38b, to which the lead tabs 38a to 38d are connected, are wound with the separator 39 sandwiched therebetween.

As FIG. 17 shows, the capacitor element 40 is contained in a bottomed cylindrical case 42 and fixed in position by a locating member 43 disposed on the inner bottom of the case 42. A terminal plate 44 seals an opening of the case 42 using an O ring 47. Terminals 45 for external connection are mounted on the terminal plate 44 and connected to the respective lead tabs 38a to 38d. A pressure vent 46 is provided on the terminal plate 44. The conventional capacitor is structured as described above.

In recent years, requirements from the market have been increasing for a capacitor to have a lower resistance and a smaller size. When reducing the internal resistance with the capacitor of the foregoing structure, there are the following methods:

1. increasing the number of lead tabs like the lead tabs 38a to 38d; and
2. optimizing the connecting positions of lead tabs such as 38a to 38d.

In addition to the methods of increasing the number of lead tabs, the lead out resistance, or resistance of electrical current collector, of the capacitor element 40 can be reduced as the number of lead tabs is increased as Equation 1 shows. When it comes to connecting the lead tabs, which are increased in number, to the terminal 45 for external connection, the increased number of lead tabs overlaid one over another have to be connected to a lead tab connecting member of the terminal 45. However, there is a limit in the number of lead tabs that are allowed to be connected to the lead tab connecting member of the terminal 45 because of such problems as a limited available space in the case 42, workability involved with lead tab connection, reliability of connection and the like, thereby prohibiting the number of lead tabs from being increased indiscriminately.

Resistance of Electrical Current Collector=$1/(3 \times n^2) \times (3 \times (L_x/L - 1/2)^2 + 1/4) \times L/W \times \rho/tp1$ (Equation 1)

where n: the number of lead tabs, $L_x$: a distance between the end of electrode and the lead tab, L: a length of electrode, W: a width of electrode, $\rho$: specific resistance of aluminum and tp1: a thickness of electrode.

Regarding the optimizing the connecting positions of the lead tabs, when the distances between adjoining lead tabs of a plurality of lead tabs such as 38a to 38d that are connected to electrodes are made equal to one another and also the distances between the end parts of electrodes 37a and 37b and the lead tabs 38a and 38c, which are located closest to the end parts of respective electrodes 37a and 38b, are made ½ of the distances between the end parts of electrode 37a and 37b and the lead tabs 38b and 38d, respectively, the lead out resistance of the electrodes 37a and 37b of the capacitor element 40 becomes an ideal value in resistance.

However, when these electrodes are wound together, the positions of lead tabs 38a to 38d led out of the respective electrodes 37a and 37b tend to be shifted in position as the lead tabs 38a to 38d move away from the center of winding, resulting in an inadvertent problem of the lead out resistance of the electrodes 37a and 37b being increased in comparison with the foregoing ideal resistance.

With a capacitor having a structure formed by the method proposed by the same inventors of the present invention in the Japanese Patent Application No. H09-322596, when both terminals of cathode and anode electrodes are arranged to be taken out in the same direction, such problems as difficulties in reducing the height of the capacitor due to a complicated internal structure and also in producing the capacitor in large quantities have been left unsolved.

The present invention aims to address the above problems and aims at providing a capacitor that enables a reduction in internal resistance as well as in the number of components and in size.

SUMMARY OF THE INVENTION

A capacitor of the present invention comprises a hollow capacitor element formed by winding a pair of flat sheet electrodes with a separator sandwiched therebetween and with edges of respective electrodes protruding in directions opposite to each other.

The edges of the electrodes are connected with an electrode connecting material by at least one selected from a group consisting of plasma-sprayed metal, welded metal, solder and a conductive adhesive material. A terminal for external connection is connected to the electrode and a metal case containing the capacitor element together with a driving electrolyte is provided with a sealing plate to close an opening of the metal case securely.

The present invention enables the capacitor thus prepared to reduce a resistance between the pair of electrodes, to realize a reduction in size and to decrease a number of the components.

BRIEF DESCRIPTION OF THE INVENTION

In the following, an explanation with the exemplary embodiments of the present invention is made with reference to drawings.

First Exemplary Embodiment

Figure 1:
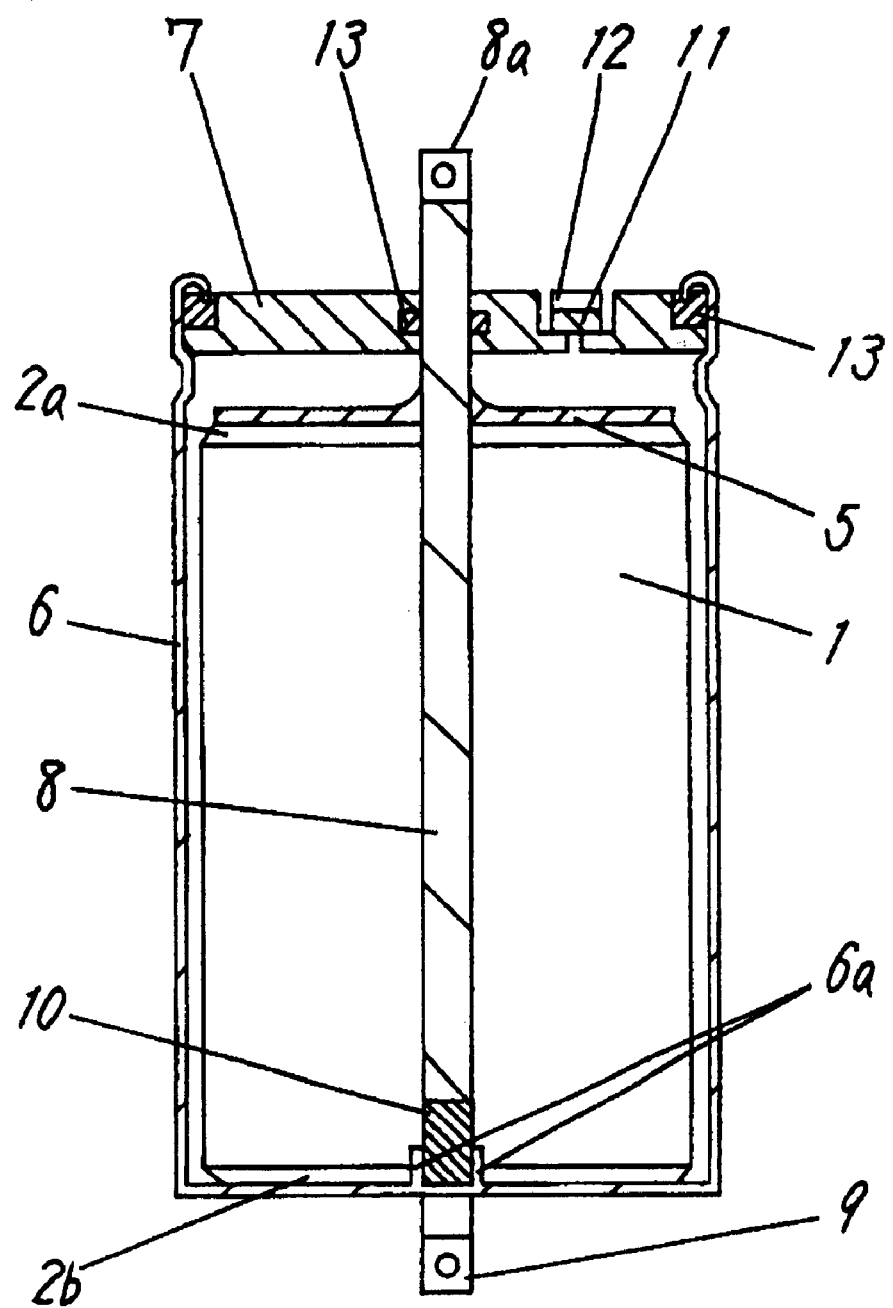
FIG. 1 is a cross-sectional view of a capacitor in a first exemplary embodiment of the present invention.

As FIG. 1 shows, the capacitor in the present exemplary embodiment includes a capacitor 1, a metal plate 5 used as an electrode connecting member connected to one end surface of the capacitor element 1, a bottomed cylindrical metal case 6 containing the capacitor element 1, a protrusion 6a disposed on the inner bottom of the metal case 6, a sealing plate 7 closing securely an opening of the metal case 6, a bar shaped core 8 with a terminal 8a for an external connection provided on one end thereof, a terminal 9 for external connection, which is joined to the outer surface of the metal case 6, an insulating material 10 to insulate the core 8 from the metal case 6, a topper 11 made of a rubber like elastic material to constitute a self-returning pressure adjustment vent in combination with a cap 12, and an O ring 13.

Figure 2A:
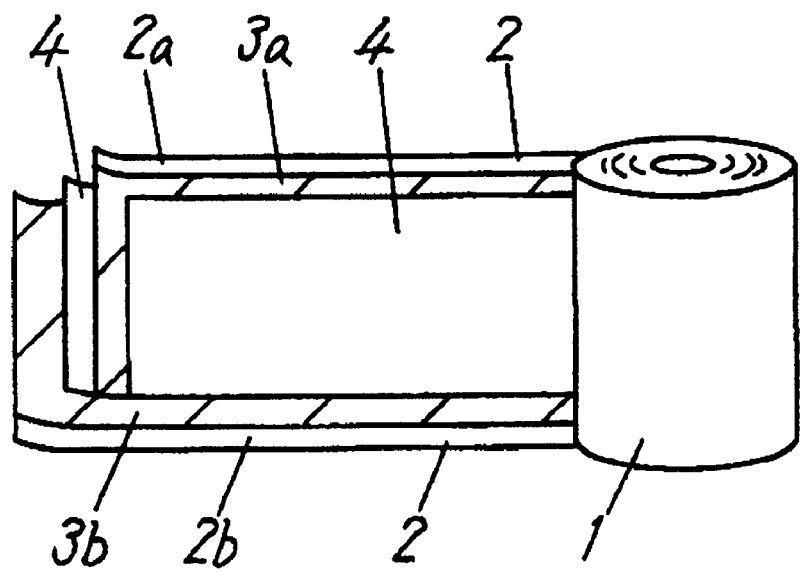
FIG. 2A is an exploded perspective view of a capacitor element in the first exemplary embodiment of the present invention.

FIG. 2A is an exploded perspective view of the capacitor element 1. Exposed portions 2a and 2b of a pair of electrodes 2 protrude in a direction opposite to each other to provide current collectors, respectively. The pair of electrodes 2, each thus arranged, are wound with a separator 4 sandwiched in between. On the surface of the electrode 2 are formed polarizing electrode layers 3a and 3b formed of a mixture of active carbon, a binder and conductive materials.

The capacitor in the present exemplary embodiment has the capacitor element 1 placed in the bottomed cylindrical metal case 6 in such a way that the end surface of one electrode of the capacitor element 1 formed by the exposed portion 2b of the current collector is electrically joined to the inner bottom of the metal case 6. On the other hand, the end surface of the other electrode of the capacitor element 1 formed by the exposed portion 2a of the current collector is joined to the metal plate 5. The metal plate 5 is joined to the bar shaped core 8 provided with the terminal 8a for external connection and disposed in the center of the capacitor element 1. The opening of the metal case 6 is securely closed with the sealing plate 7 provided with a hole for the bar shaped core 8 to pass through. Accordingly, since the metal case 6 acts as a current collector terminal, a substantial reduction in the height of the capacitor becomes possible and also a reduction of components is allowed in comparison with a prior art capacitor.

The sealing plate 7 can be made of a metallic material and/or an insulating polymer material. When the sealing plate 7 is made of an insulating polymer material, the strength of the sealing plate 7 tends to become weaker when compared with a sealing plate 7 made of a metallic material. Therefore, the thickness of the sealing plate 7 needs to be increased, resulting in an adverse effect to the reduction of capacitor height. But, the sealing plate 7 made of an insulating polymer material is advantageous to the insulation between the metal case 6 and the terminal 8a for external connection, thereby contributing to a simplified assembly process of the capacitor.

When the sealing plate 7 is made of a metallic material, a greater strength can be gained when compared with a sealing plate 7 made of an insulating polymer material, thereby allowing the sealing plate 7 to perform the intended function with a smaller thickness and to contribute to lowering the capacitor height. On the other hand, an insulating material needs to be placed between the metal case 6 and the terminal 8a in order to keep the metal case 6 insulated from the terminal 8a.

When the sealing plate 7 is formed in an integral one-piece structure or formed of a composite material using a metallic material and an insulating polymer material together, the thinner sealing plate 7 yet having a fairly high insulating property can be realized and the two purposes of a low profile configuration and adequate insulation for the capacitor can be obtained at the same time, thereby enabling the capacitor's production process to be simplified.

By disposing the bar shaped core 8 for positioning and/or fixing of the capacitor element 1 in the center of the capacitor element 1, the core 8 is allowed to serve as a winding core when the capacitor element 1 is formed by winding, for example, thereby enabling the winding to be performed more tightly when compared with the case where the core 8 is not used. The tight winding of the capacitor element 1 reduces the possibilities for the wound elements to be displaced from the original positions and also enables the distance between the pair of the electrodes to be shortened, thereby contributing to a reduction of the capacitor's internal resistance. Additionally, when a vibrating force is applied to the capacitor from outside, the resultant mechanical stress imposed to the junction between the end surface of the capacitor element 1 and the electrodes can be reduced, thereby making it possible to produce the capacitor having an enhanced resistance to the vibration. Also, in this case, the protrusion 6a for fixing the core 8 provided on the metal case 6 and the like contributes to the enhancement of vibration resistance effectively.

A material for the core 8 can be selected from the group of metallic materials and/or and insulating polymer materials. When the core 8 is formed in an integral one-piece structure or formed of a composite material, using a metallic material and an insulating polymer material together, there is no danger of short circuiting between the two electrodes connected, respectively, to the end surface of the capacitor element 1 via the core 8, thereby eliminating the need to use a separate insulator between the two electrodes. Furthermore, when internal heat is generated while the capacitor is in use, the metal part of the core 8 can contribute to the radiation of the heat to the outside. In this case, it is needless to say that the existence of the more metal part can result in the enhancement of the radiation of the heat to outside.

The capacitor element 1 in the present exemplary embodiment has the exposed portions 2a and 2b of the electrode end surface protruded from the capacitor element 1 joined with the metal plate 5 and metal case 6 electrically. As the joining method to be employed, at least one is selected from the methods of metal plasma-spraying, welding, soldering and adhesion using a conductive adhesive. Thus, the apparent volume resistance of the pair of electrodes can be reduced.

For example, when each of the pair of electrodes uses an aluminum foil ($\rho=0.0265$) of 98 mm wide by 3600 mm long with a thickness of 0.022 mm and the metal plate 5 is joined to each respective end surface of the electrodes, the volume resistance of the whole aluminum foil constituting the pair of electrodes is about 0.02 m$\Omega$ according to the calculation using Equation 1. Meanwhile, when electrodes of the same size are used and four lead tabs are taken out with an equal spacing between the adjoining lead tabs from a pair of the electrodes in the prior art capacitor, the volume resistance calculated is about 0.46 M$\Omega$.

As is clearly shown from the above, the internal resistance of the capacitor prepared according to the present invention can be reduced. By using as the pair of flat electrodes shown in FIG. 2A, which has a polarizing electrode layers 3a and 3b formed of a mixture of active carbon, a binder and a conductive material disposed, respectively, on a current collector formed of a metal foil or a conductive high polymer, a electric double-layer capacitor utilizing an electric double-layer formed on the boundary surface of the polarizing electrode layers 3a and 3b can be obtained. Thus, the structure of the capacitor disclosed by the present invention can be utilized most effectively in obtaining an electric double-layer capacitor. Since the internal resistance of such an electric double-layer capacitor is small, the magnitude of an abrupt increase or decrease in voltage at the time of charging/discharging can be made small even if charging or discharging with large currents is performed, thereby enabling the electric double-layer capacitor to be charged/discharged with large currents.

When a pair of flat metal foils are formed of aluminum, the structure as described above can be utilized in an aluminum electrolytic capacitor. Since an internal heat generation of such an electrolytic capacitor is reduced because of a reduction in internal resistance compared with a prior art aluminum electrolytic capacitor even when large currents flow through the capacitor, a capacitor for an inverter circuit in which a higher ripple current capability is required can be obtained with this embodiment.

Further, when a functional high polymer or a composite material formed of a separator and a functional high polymer is used instead of the separator sandwiched between the pair of electrodes and also the electrolyte impregnated in the foregoing separator, a functional high polymer capacitor can be obtained. According to the structure of the present invention, a functional high polymer capacitor with lower impedance in comparison with a prior art winding electrode type functional high polymer capacitor can be obtained. The functional high polymer capacitor prepared according to the present invention does not present such a problem as drying up of electrolyte as experienced with an aluminum electrolytic capacitor using an electrolyte fluid, thereby a longer life capacitor can be obtained.

Next, will be described the case where laser welding is employed for joining the metal plate 5 to the exposed portion 2a of the collector and the exposed portion 2b of the current collector to the inner bottom surface of the metal case 6, particularly relating to joining the metal case 5 to the exposed portion 2a of the current collector.

When the metal plate 5 and exposed portion 2a are welded together by an laser welding, the joining is performed by irradiating laser from the side of the metal plate 5 to the direction of the exposed portion 2a of the electrical current collector, and, when the inner bottom surface of the metal case 6 and the exposed portion 2b are joined together, the joining is performed by an irradiating laser from the outside of the bottom surface of the metal case 6 to the direction of the exposed portion 2b. At this time, by applying a surface treatment such as chemical etching, for example, to the surface of the metal plate 5 at the side of the sealing plate 7 and to the outer surface of the bottom of the metal case 6 for the purpose of increasing laser light absorption, an absorption of the laser can be increased, thereby enabling the welding with lower energy due to better absorption of laser in comparison with the case where no surface treatment is employed, thereby enabling the time of laser irradiation to be shortened and consequently productivity is increased.

Figure 2B:
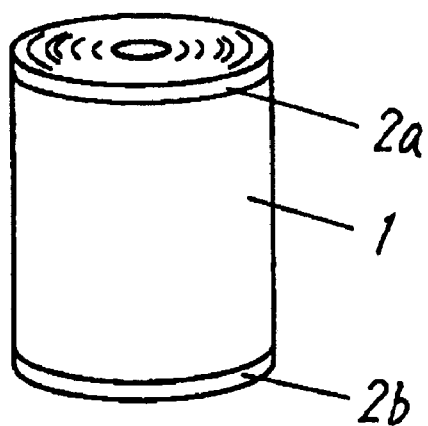
FIG. 2B is a perspective view of the capacitor element in the first exemplary embodiment of the present invention.

In addition, by disposing the metal plate 5 on the respective exposed portions 2a and 2b of the capacitor element 1 as in FIG. 2(b) and connected electrically thereto, and by molding the capacitor element 1 with an encapsulating resin, the step of sealing the opening of the metal case 6 by applying a constriction process near the end thereof no longer becomes necessary. The capacitor element 1 can be resin molded and at same time sealed, thereby making it possible for the production processing steps to be reduced. Also, the dimensional adjustment for sealing required at the time of product switching is eliminated and further enhancement of productivity is obtained.

In place of the bottomed cylindrical metal case 6 as described above, a cylindrical metal case with the both ends thereof made open can be used and both ends of the metal case are provided with a sealing plate, respectively, to build the structure of a capacitor. According to this structure, an extra step of joining a sealing plate to each of the ends of the capacitor element is required, but the process of confirming the position where the joining takes place becomes easier, thereby facilitating controlling of the joining process.

Second Exemplary Embodiment

Figure 3:
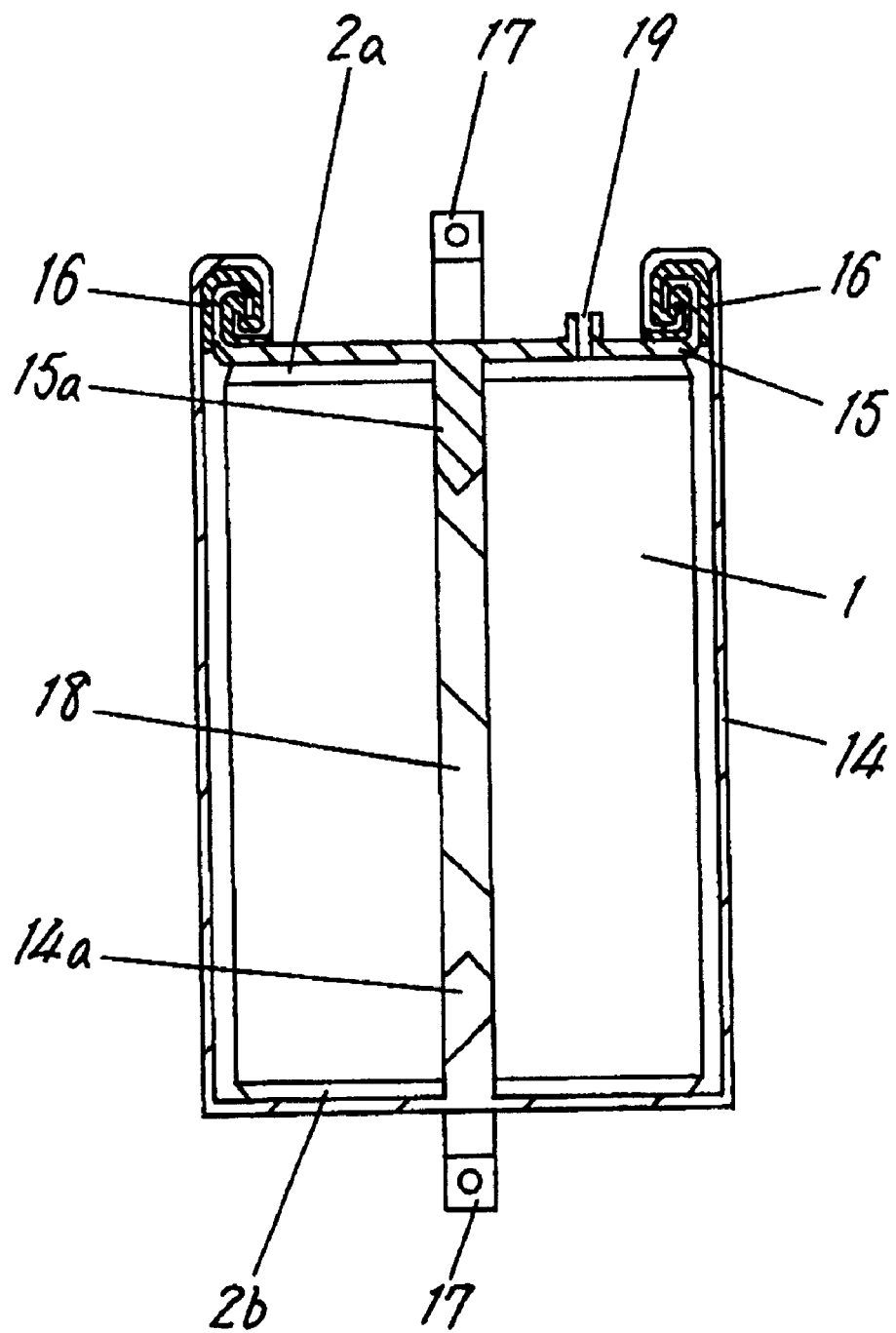
FIG. 3 is a cross-sectional view of a capacitor in a second exemplary embodiment of the present invention.

FIG. 3 is a cross-sectional view of a capacitor in a second exemplary embodiment of the present invention. In FIG. 3, a capacitor element 1 is contained in a bottomed cylindrical metal case 4. A protrusion 14a for fixing the capacitor element 1 in position is disposed on the inner bottom surface of the metal case 14. A sealing plate 15 (an electrode connecting member) joined to the end surface of the capacitor element 1 has a protrusion 15a for fixing the capacitor element 1 in place. The metal case 14 and the sealing plate 15 are insulated from each other with an insulating material 16.

A terminal 17 for external connection is connected to the metal case 14. A bar shaped core 18 is provided in the center of the capacitor element 1 and a through hole 19 for filling an electrolyte is provided on the sealing plate 15.

Thus, the capacitor in the present exemplary embodiment has an exposed portion 2b of one current collector of the capacitor element 1 electrically joined to the inner bottom surface of the metal case 14 and also an exposed portion 2a of the other current collector of the capacitor element 1 electrically joined to the sealing plate 15, which closes the opening of the metal case 14 securely, thereby forming a capacitor.

Since the sealing plate 15 of the capacitor in the present exemplary embodiment serves as the metal plate 5 of the capacitor in the first exemplary embodiment, the height of the capacitor can be reduced substantially and also the number of the components can be reduced much more than the capacitor in the previous exemplary embodiment.

Figure 4:
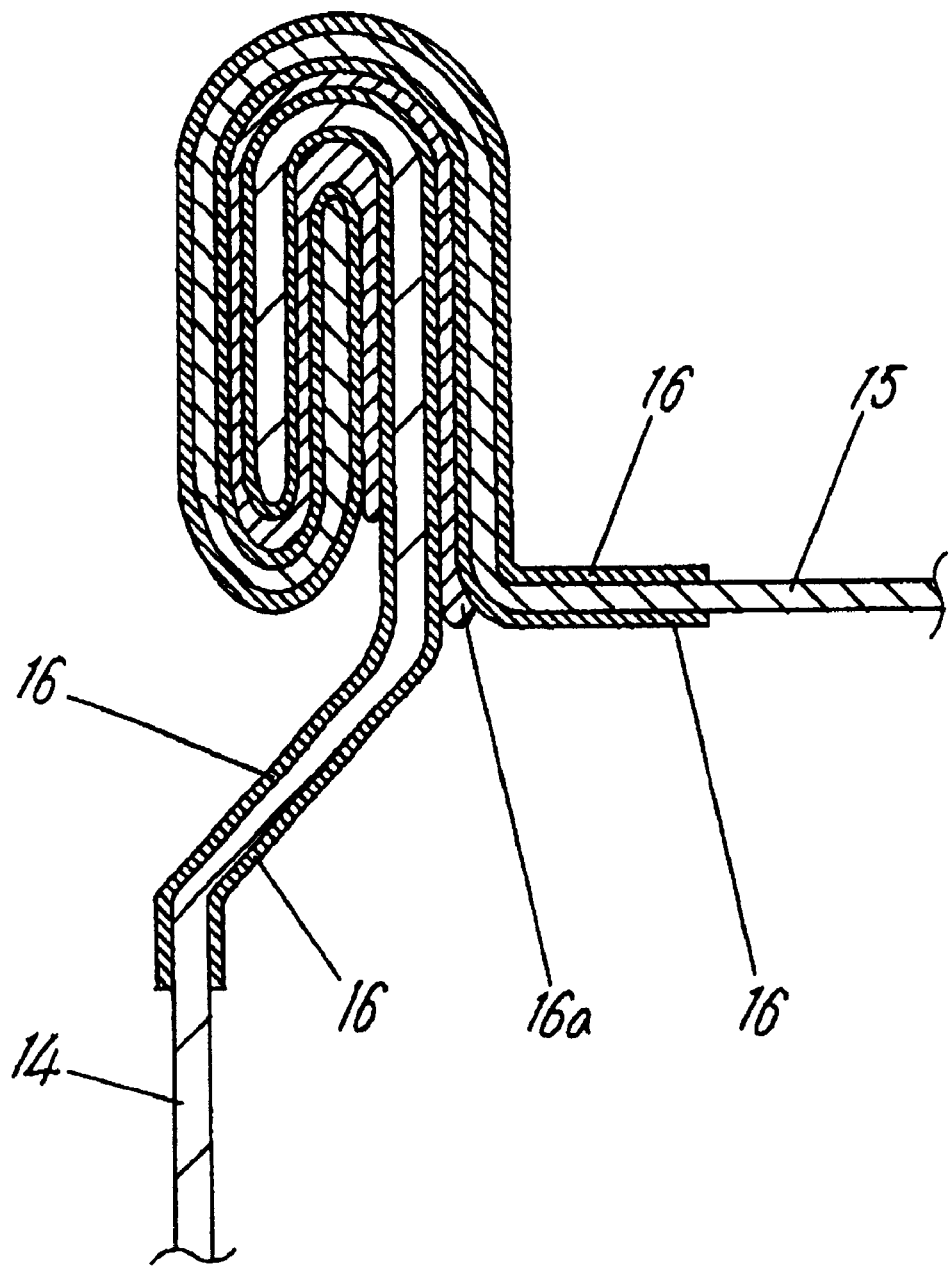
FIG. 4 is a detailed cross-sectional view of a curled section of the capacitor in the second exemplary embodiment of the present invention.

When the sealing plate 15 is formed of a metal, for example, it has both functions of a sealing plate and a current collector, but an insulating material 16 is needed to be placed between the metal case 14 and the sealing plate 15, where a curling process is applied as FIG. 4 shows, in order for the insulation to be maintained between the metal case 14 and the terminal 17.

Additionally, in order to intensify further the sealing at the opening of the metal case 14, it is preferred to apply a sealant 16a to the place where the curling process is applied. Particularly, when a rubber like elastic material is placed between the sealing plate 15 and the metal case 14 at the place where the curling process is applied, the sealing at the opening of the metal case 14 is further intensified by the curling process, thereby allowing the life of the capacitor to be further extended.

In the present exemplary embodiment, the capacitor is structured in such a way that the opening of the metal case 14 is closed securely by applying a curling process to the outer periphery of the sealing plate 15 and the rim of the opening of the metal case 14 at the same time. Accordingly, the sealing of the sealing plate 15 connected to the capacitor element 1 is facilitated and a reduction in the height of the capacitor is made possible. In addition, the effect of curling is the same whether the curling process is applied to inside or outside of the metal case 14.

Furthermore, by having the protrusions 14a and 15a provided on the inner bottom surface of the metal case 14 and on the sealing plate 15, respectively, it is made possible for the capacitor element 1 to be aligned in position and/or fixed in place.

By having these protrusions, a mechanical stress created at the joint between the end surface of the capacitor element 1 and the sealing plate 15 when vibrations are applied to the capacitor from outside can be reduced, thereby enabling the capacitor thus structured to increase the resistance to vibrations and also to expand the capabilities of radiating heat to outside even when internal heat is produced while the capacitor is used.

By making the through hole 19 for filling an electrolyte into the inside of the capacitor provided on the sealing plate 15, the capacitor element 1 is allowed to be impregnated with the electrolyte at the last stage of the capacitor production process, thereby facilitating the control of the amount of electrolyte to be filled in the capacitor and also making it possible for the electrolyte to prevent from getting exposed to the outside atmosphere and absorbing moisture during the production process.

As FIG. 3 shows, the opening of the capacitor is sealed by applying inward a curling process to the outer periphery of the sealing plate 15 and the rim of the opening of the metal case 14 at the same time, but as FIG. 4 shows, an application of the curling process outward to the same can result in the same effect.

Also, as FIG. 4 shows, in order not to exceed the maximum diameter of the outer periphery, where the curling process is applied, the outer diameter of the metal case 14, a necking process had better be applied to the metal case 14 before the curling process so as to reduce the diameter of the opening of the metal case 14.

Instead of placing between the metal case 14 and the sealing plate 15 as FIG. 4 shows, the insulating material 16 may also be provided, for example, by applying a coating of an insulating material to the outer periphery of the sealing plate 15 and the rim of the opening of the metal case 14 in advance. Also, by performing at least one process selected from the processes of degreasing, surface roughening and oxide film forming, the peeling off of the coating of the insulation material existing between the sealing plate 15 and the metal case 14 can be reduced, thereby enabling the insulation to be maintained better between the sealing plate 15 and the metal case 14.

In FIG. 3 also, by applying a surface treatment to the outer surface of the sealing plate 15 and the outer surface of the bottom of the metal case in the same way as in the case of the first exemplary embodiment, particularly when the sealing plate 15 and the exposed portion 2a of the current collector are joined together by using a laser welding method, the ability of the surfaces involved to absorb laser light can be multiplied, whereby the productivity can be increased.

When each respective end surface of the capacitor element 1 is joined to the metal plate 5 and metal case 6 or to the sealing plate 15 and metal case 14, respectively, by using laser welding, a phenomenon of mechanical resonance of the capacitor element 1 can be prevented even when vibrations are applied to the capacitor element 1 by making the foregoing joining places of respective end surfaces located at positions unsymmetrical with respect to the winding axis of electrodes.

Third Exemplary Embodiment

Figure 5:
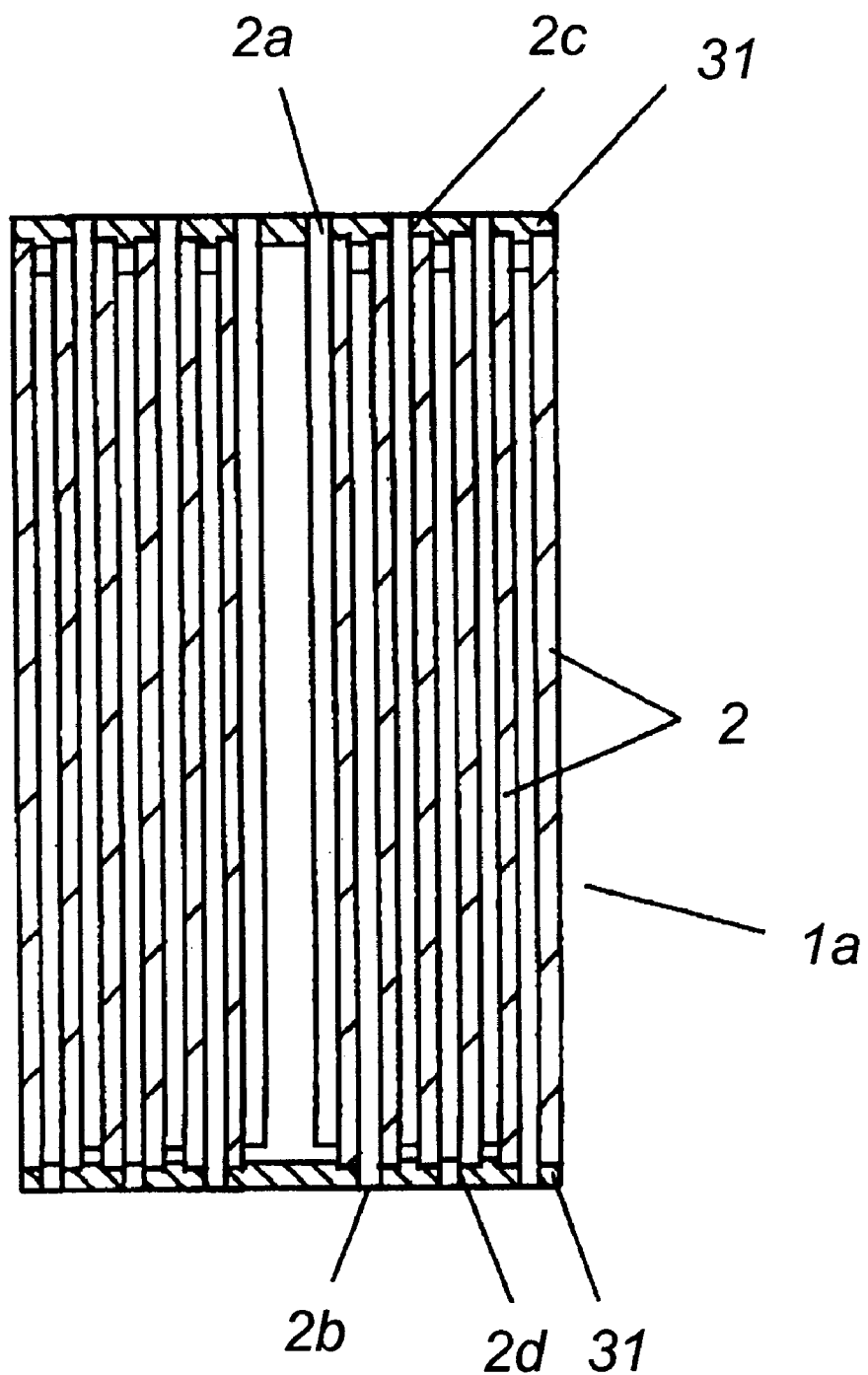
FIG. 5 is a cross-sectional view of a capacitor element in a third exemplary embodiment of the present invention.

FIG. 5 is a cross-sectional view of a capacitor element in a third exemplary embodiment of the present invention. The capacitor element 1a of the present exemplary embodiment is prepared by applying a conductive material 31 (an electrode connecting member) to a place in the vicinity of each of the exposed portions 2a and 2b of the respective current collectors of the electrode 2 in the first exemplary embodiment, then, the applied conductive material 31 is cured, and the places applied with the conductive material 31 are subjected to a flattening process to make the places flat. The same processing as above is applied to the end surfaces 2c and 2d located at the opposing sides of the electrode 2, respectively. According to the foregoing structure, where the vicinity of each of the exposed portions 2a and 2b of the current collector of the electrode 2 is fixed solidly with the use of the conductive material 31, the exposed portions 2a and 2b are prevented from being bent. In addition, since the end surfaces 2a, 2b, 2c and 2d are protruded from both ends of the capacitor element 1a, the joining between the metal plate and metal case or the sealing plate and metal case and the end surfaces of the electrode 2 can be performed securely.

Fourth Exemplary Embodiment

Figure 6:
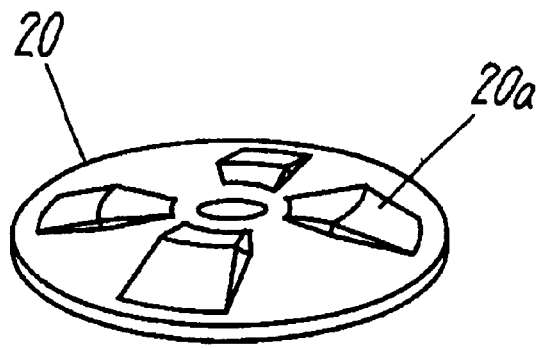
FIG. 6 is a perspective view of a sealing plate in a fourth exemplary embodiment of the present invention.

FIG. 6 and FIG. 7 show a capacitor's sealing plate in a fourth exemplary embodiment of the present invention. FIG. 8 shows an example of the detailed configuration of the metal plate 5 of FIG. 1. As FIG. 6 shows, an uneven area 20a with a wave like or mound like surface configuration is formed at a few places on the sealing plate 20 on the side contacting the capacitor element 1. In the step of impregnating an electrolyte in the capacitor element 1 after the step of joining the sealing plate 20 to the capacitor element 1, the uneven areas 20a with the foregoing structure, each provided with a wave like or mound like surface configuration, form a kind of infiltrating channel, through which the electrolyte is filled into the capacitor element 1.

Figure 7A:
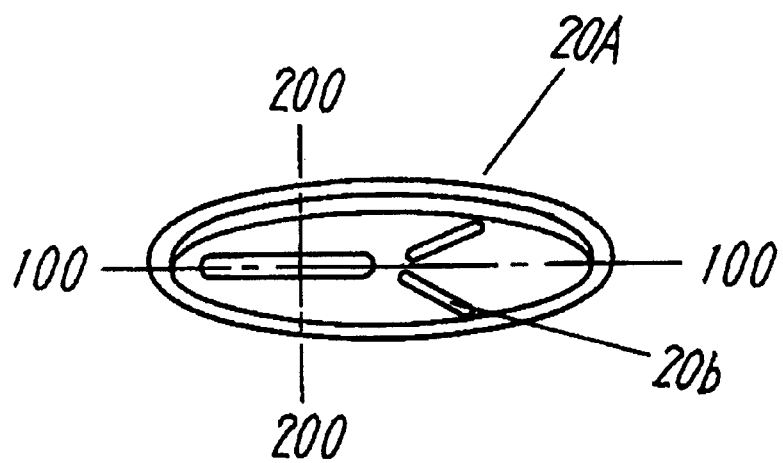
FIG. 7A is a perspective view of another sealing plate in the fourth exemplary endowment of the present invention.
Figure 7B:
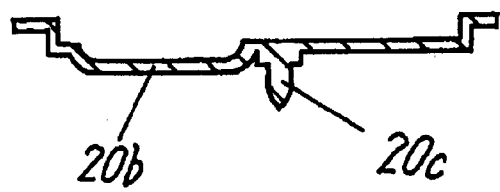
FIG. 7B is a cross-sectional view of the sealing plate of FIG. 7A cut along the line 100—100.
Figure 7C:
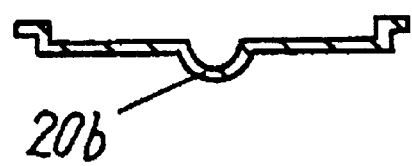
FIG. 7C is a cross-sectional view of the sealing plate of FIG. 7A cut along the line 200—200.
Figure 8:
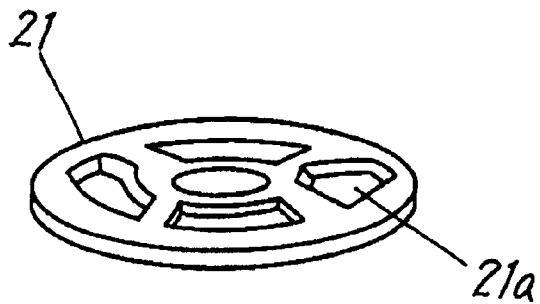
FIG. 8 is a perspective view of a metal plate in the fourth exemplary embedment of the present invention.

FIG. 7A to FIG. 7C show some other examples of the sealing plate. FIG. 7B shows a cross-sectional view of a sealing plate 20A of FIG. 7A, which is cut along the line 100—100, and FIG. 7C shows a cross-sectional view of the same, which is cut along the line 200—200. By disposing the sealing plate 20A with the uneven areas 20b, each having a wave like or mound like surface configuration, on the electrode 2 of the capacitor element 1 so as to have the uneven areas 20b pressed down thereon, the end surface of the electrode 2 is subjected to a swaging process partially. By irradiating laser light to the places subjected to the swaging process from the side of the sealing plate 20A in the direction of the electrode 2 of the capacitor element 1 to join the sealing plate 20A and the end surface of the capacitor element 1 together, secure joining is made possible.

A protrusion 20c that comes into contact with the core of the capacitor element 1 is disposed on the sealing plate 20A for the purpose of preventing a flat area of the sealing plate 20A from contacting the end surface 2 of the capacitor element 1 without hitting the end surface directly when the uneven areas 20b are pressed down onto the electrode 2, thereby facilitating the electrolyte to infiltrate into the capacitor element 1 by providing gaps between the sealing plate 20A and the end surface 2 of the capacitor element 1, which act as a sort of infiltration channels.

Such an uneven area 20b with a wave like or mound like surface configuration and a protrusion 20c can be formed on the bottom surface of the metal case or metal plate to achieve the same effect.

Also, as FIG. 8 shows, a missing area 21a shaped like a slit, a hole and the like is provided on the metal plate 21, thereby enabling the metal plate 21 to be joined with the capacitor element 1 by using a metal plasma-spraying method, for example.

In practice, according to the metal plasma-spraying method, the capacitor element 1 is pressed onto the metal plate 21 and melted metal is blasted at a predetermined area from the side of the metal plate 21, thereby joining together the end surface of the missing area 21a of the metal plate 21 and the protruded area 20a of the electrode of the capacitor element 1, which is in contact with the foregoing end surface, with the molten metal acting as a joining agent. When the capacitor element 1 is joined to the metal plate 21 according to a metal plasma-spraying method, the missing area 21a of the metal plate 21 is absolutely needed.

Also, when other joining methods are used, the missing area 21a serves as an infiltrating channel for an electrolyte to infiltrate into the capacitor element 1 when the capacitor element 1 is impregnated with the electrolyte.

Fifth Exemplary Embodiment

FIG. 9 to FIG. 12 are cross-sectional views of a pressure adjustment vent for a capacitor in a fifth exemplary embodiment of the present invention. All of these pressure adjustment vents are a self-returning type and intended for releasing a pressure to outside when the internal pressure of a capacitor reaches or exceeds a predetermined pressure.

Figure 9:
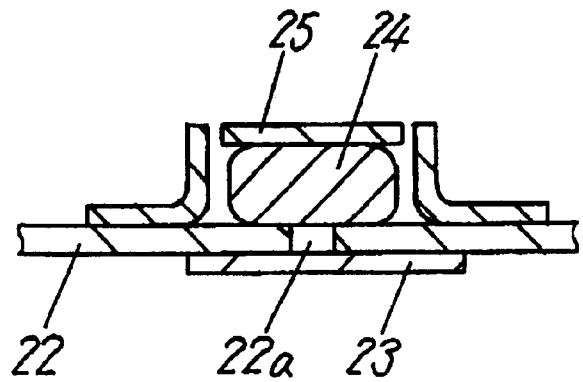
FIG. 9 is a cross-sectional view of a pressure adjustment vent in a fifth exemplary embodiment of the present invention.

First, a description is made on a pressure adjustment vent as shown FIG. 9.

The pressure adjustment vent has a through hole 22a leading to the inside of a capacitor, provided on a sealing plate 22 and a stopper 24 made of a rubber like elastic material is disposed so as to cover the through hole 22a. Further, a cap 25 having a hole to act as a path to outside is disposed closely on the stopper 24 and the stopper 24 is structured in such a way that a force is always applied thereto so as to close the through hole 22a. In case where the sealing plate 22 and cap 25 are formed of metal, for example, a setup of putting together the sealing plate 22 and cap 25 by welding and the like is considered as a specific method for applying the closing force to the stopper 24, thereby facilitating the implementation of the enclosing arrangement and closing force application.

Figure 13:
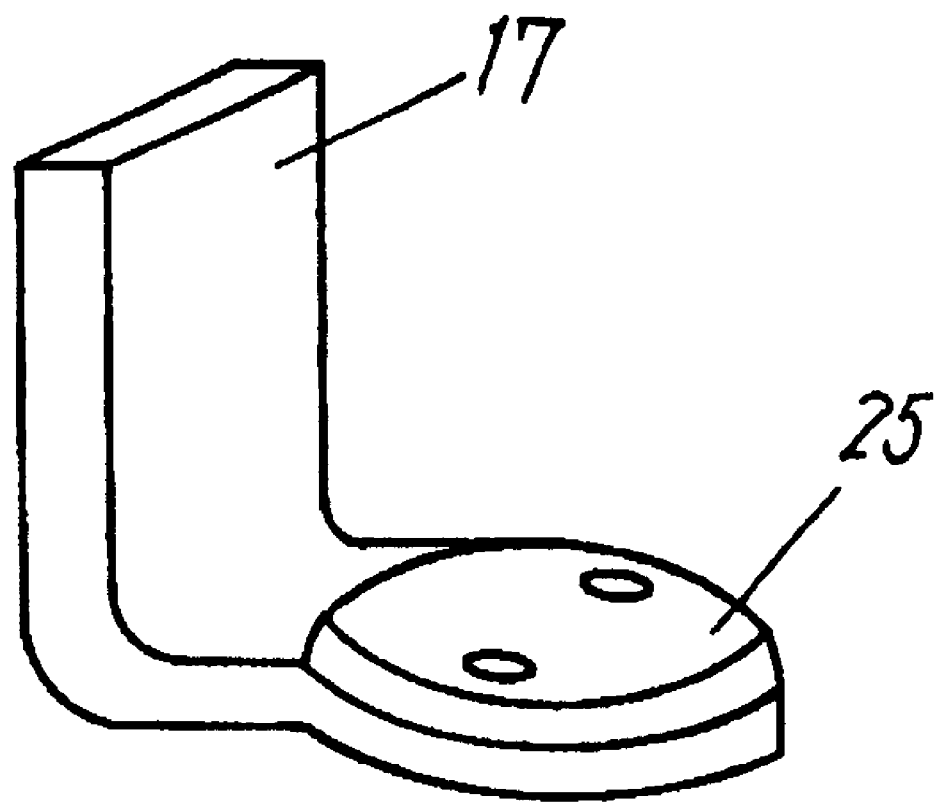
FIG. 13 is a perspective view of still another pressure adjustment vent.

Also, another method for applying the closing force may be considered a setup of making the cap 25 integral with the terminal 17 for external connection as FIG. 13 shows. In this case, the mounting of the cap 25 for the pressure adjustment vent and the joining of the terminal 17 can be performed at the same time, thereby improving the productivity involved with the capacitor.

According to the structure as described above, it becomes possible to achieve such an effect as allowing the safety vent activated at a predetermined pressure to be easily constructed by optimizing the material and shape of the rubber used in the safety vent.

Also, as FIG. 9 shows, a sheet like member 23 formed of a material that prevents an electrolyte from passing through and yet passes a gas produced inside of the capacitor to outside may be disposed closely on the sealing plate 22 on the capacitor element side thereof. The sheet like member 23 can prevent the electrolyte from infiltrating into the pressure adjustment vent, thereby preventing a malfunction of the pressure adjustment vent due to the adhesion of a dissolved substance of the electrolyte to the stopper 24. In addition, the sheet like member 23 can prevent the electrolyte from leaking outside from the inside of the capacitor via the pressure adjustment vent.

Figure 10:
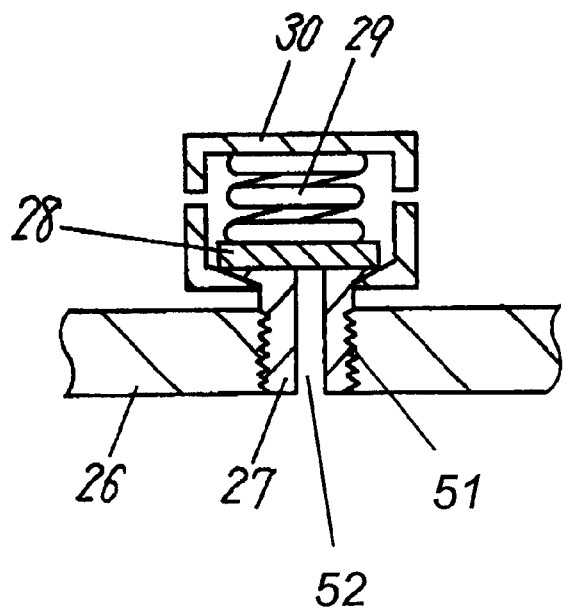
FIG. 10 is a cross-sectional view of another pressure adjustment vent.

Next, a description is given to a pressure adjustment vent as shown FIG. 10.

A pressure adjustment vent of FIG. 10 has a vent base 27 with a through hole disposed on a through hole that is provided on a sealing plate 26, the through hole leading to the inside of a capacitor, a stopper formed of stopper 28 and a metal spring 29, the stopper being arranged so as to close the through hole of the vent base 27, and a cap 30 is disposed in such a way that the stopper is sandwiched between the vent base 27 and the cap 30.

The pressure adjustment vent of the foregoing structure is allowed to be produced in a separate production process, mounted easily on a capacitor and embedded in a thick part of the capacitor when the thickness of the part of the capacitor where the pressure adjustment vent is mounted is large enough. Further, by optimizing the shape of the stopper and the spring tension of the spring, a safety vent that is activated at a predetermined pressure can be constructed easily.

Figure 11A:
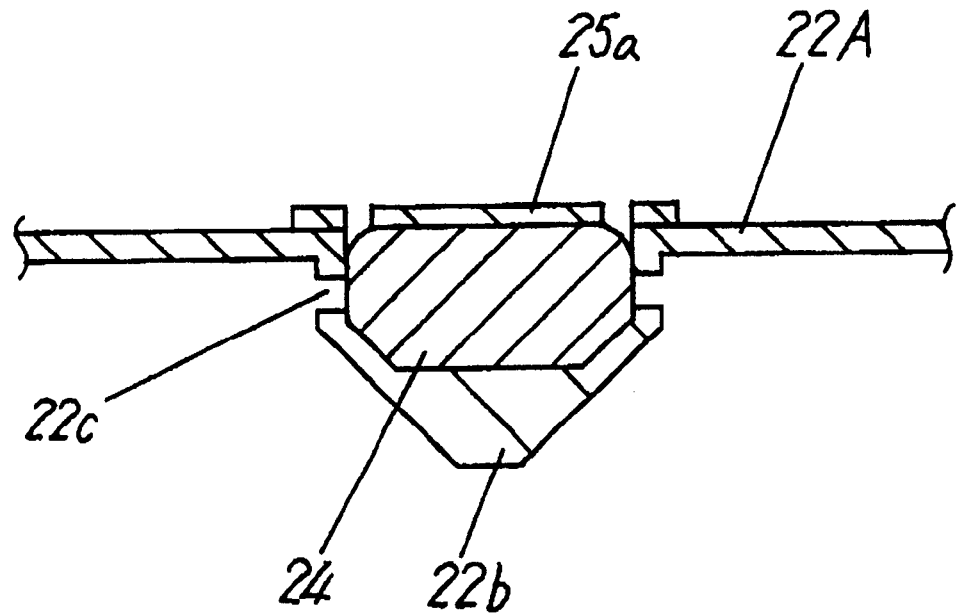
FIG. 11A is a cross-sectional view of yet another pressure adjustment vent.

Next, a description is given to pressure adjustment vents as shown in FIG. 11.

A pressure adjustment vent of FIG. 10 has a vent base 27 with a second through hole 52 disposed in a through hole 51 that is provided on a sealing plate 26, the through hole leading to the inside of a capacitor, a stopper formed on stopper 28 and a metal spring 29, the stopper being arranged so as to close the second through hole 52 of the vent base 27, and a cap 30 is disposed in such a way that the stopper is sandwiched between the vent base 27 and the cap 30.

Figure 11B:
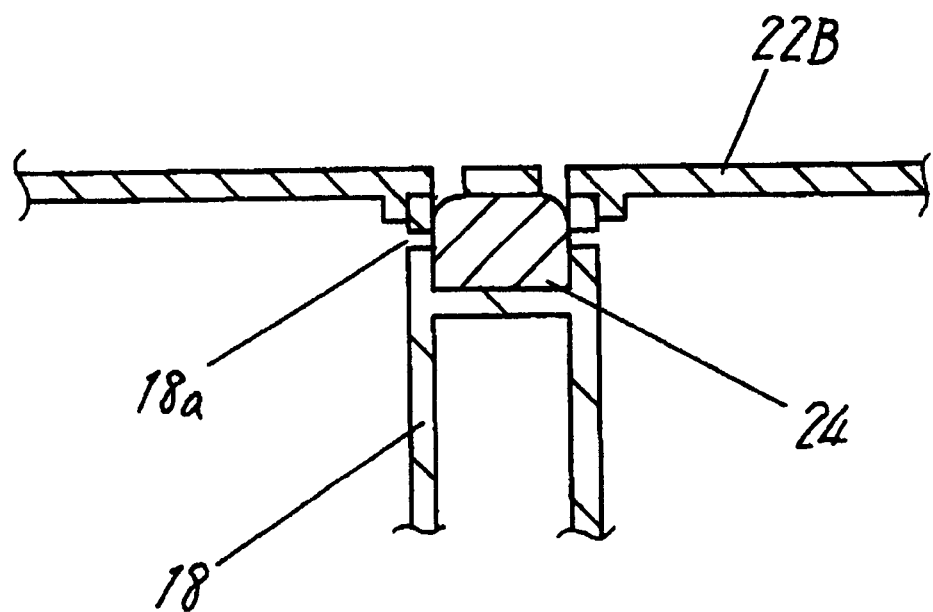
FIG. 11B is a cross-sectional view of still another pressure adjustment vent.

Also, as FIG. 11B shows, a pressure adjustment vent is provided in a sealing plate 22B, which is used when a bar shaped core 18 is disposed in the center of the capacitor element 1. A hollow for containing the stopper 24 is provided in the end part of the bar shaped core 18, a through hole and/or a cutaway part 18a of the bar shaped core 18 for leading to the inside of the capacitor are provided in the hollow, where the stopper 24 is contained, and the hollow is covered with the sealing plate 22B provided with a through hole to lead to the outside of the capacitor. Accordingly, a pressing force can be applied in such a way that the stopper 24 always performs the function of closing.

As a result, the cap is no longer needed since the sealing plate 22B serves the function of applying a pressing force so as to allow the stopper 24 always to perform the function of closing, thereby allowing the number of components to be decreased. Furthermore, since the pressure adjustment vent has no parts sticking out of the contour of the capacitor, the outline dimensions of the capacitor can be made small and also without requiring the bar shaped core 18 to change the configurations thereof greatly, the bar shaped core 18 can serve two functions of adjusting an internal pressure of the capacitor and acting as the core for the capacitor element 1.

Next, a description is given to a pressure adjustment vent as shown in FIG. 12.

Figure 12A:
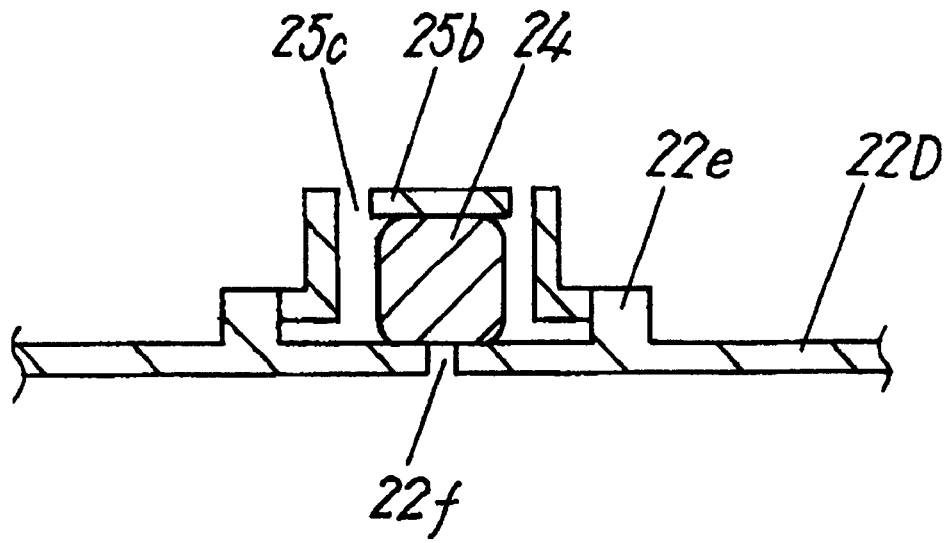
FIG. 12 is a cross-sectional view of still another pressure adjustment vent.
Figure 12B:
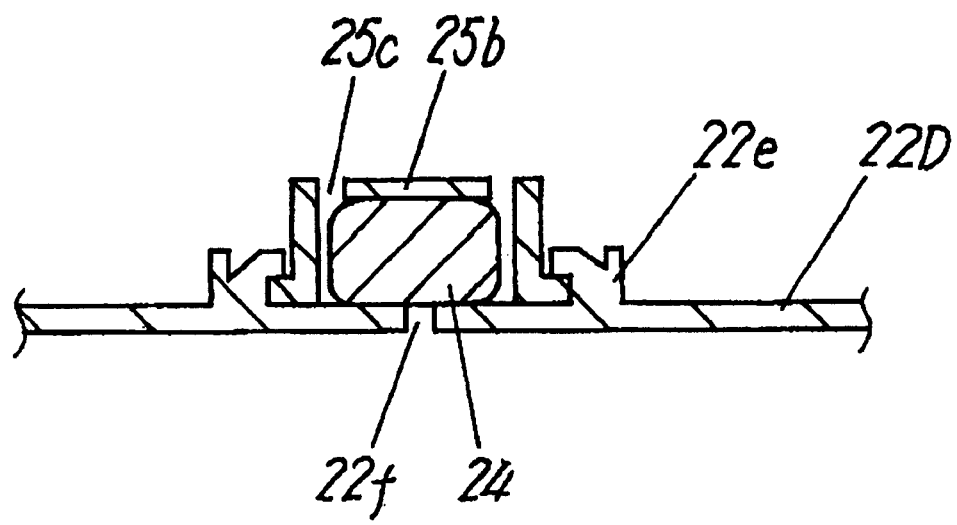

In FIG. 12A, a protuberance 22e and a through hole 22f leading to the inside of a capacitor are provided on a sealing plate 22D. FIG. 12A shows the state, in which the stopper 24 is disposed so as to be overlaid on the through hole 22f and the stopper 24 is covered with a cap 25b having a through hole 25c leading to outside. Then, as FIG. 12B shows, the protrusion 22e is deformed by crimping with a punch to have the cap 25b held by the sealing plate 22D, thereby allowing the stopper 24 to be enclosed with the cap 25b and sealing plate 22D. According to the structure of FIG. 12(b), when the cap 25b is mounted on the sealing plate 22D and the like, the mounting process can be performed quickly, thereby contributing to the productivity greatly.

In other words, when cropped with the method of mounting the cap by first having threads for screwing formed on the cap and the sealing plate and/or metal case or the vent base, and then screw tightening, or mounting the sealing plate and/or metal case or the vent base by a drawing process with the use of a roller, the mounting process can be finished in a short period, resulting in a contribution to the productivity.

Thus, by installing a self-returning type pressure adjustment vent, which releases the internal pressure of a capacitor when the pressure reaches or exceeds a predetermined pressure, on the sealing plate and/or metal case, the internal pressure of the capacitor can be prevented from becoming excessively high by releasing the gas produced inside of the capacitor to outside. The pressure adjustment vent returns to the normal status of before vent activation after having activated the vent, thereby enabling the capacitor to be hermetically sealed and also to keep the appearance even if the internal pressure is excessively increased due to gas generated inside the capacitor.

Sixth Exemplary Embodiment

Figure 14:
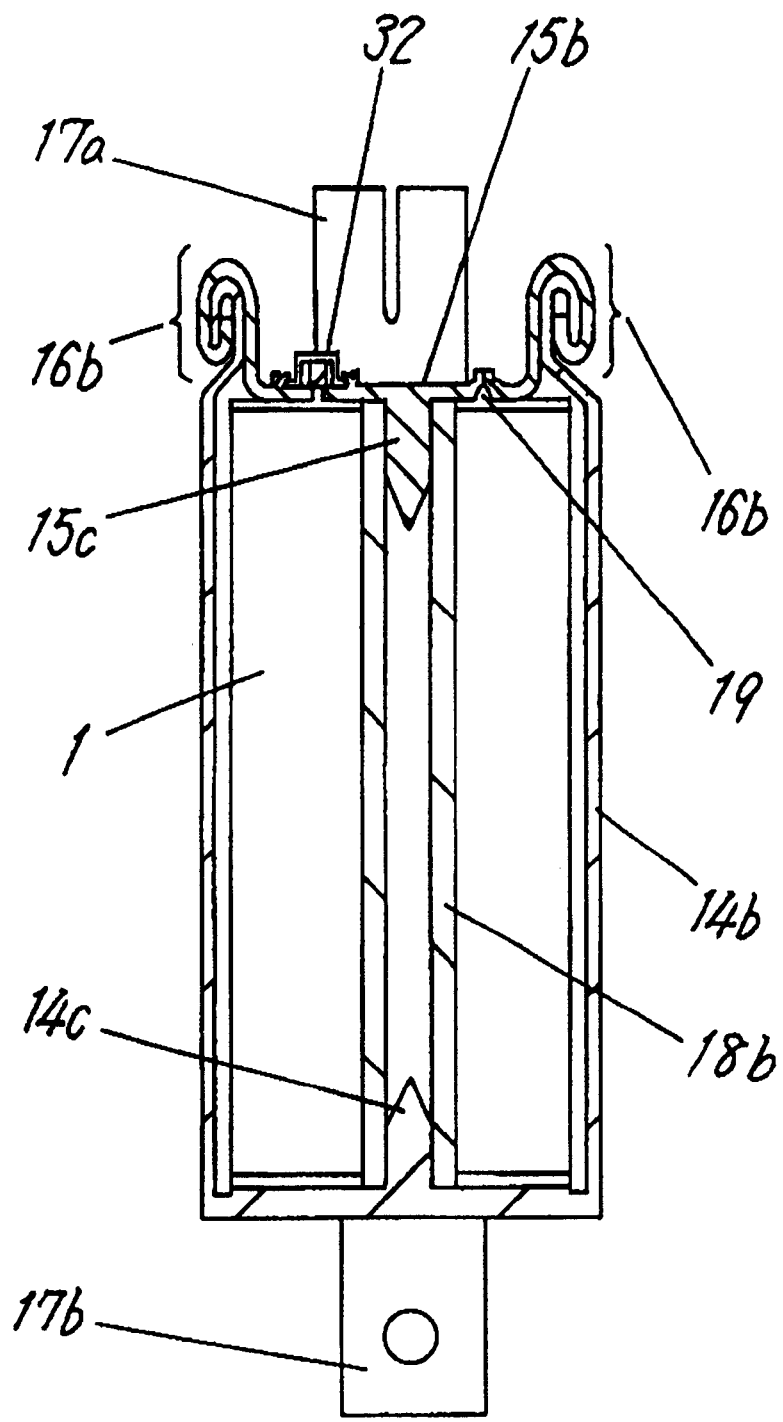
FIG. 14 is a cross-sectional view of a capacitor in a sixth exemplary embodiment of the present invention.

FIG. 14 is a cross-sectional view of a capacitor in a sixth exemplary embodiment of the present invention.

A capacitor according to the present exemplary embodiment comprises a capacitor element 1, a bottomed cylindrical metal case 14b made integral with a terminal, containing the capacitor element 1, a protrusion 14c with a polygon shaped periphery, disposed on the inner bottom of the metal case 14b for fixing the position of the capacitor element 1, a sealing plate 15b made integral with a terminal and joined to the end surface of the capacitor element, a protrusion 15c with a polygon shaped periphery, provided on the sealing plate 15b for fixing the position of the capacitor element 1, an anodized aluminum part 16b, a flat terminal 17a for external connection, having a slit provided thereon, a flat terminal 17b for external connection, having a hole provided thereon, a bar shaped core 18b with a hollow, disposed in the center of the capacitor element 1 and a through hole 19 for filling an electrolyte and a pressure adjustment vent 32, both provided on the sealing plate 15 made integral with a terminal.

With the capacitor of the present exemplary embodiment structured as described above, the protrusions 14c and 15c having a polygon shaped periphery, respectively, are inserted in the respective corresponding hollow sections of the core 18b with a polygon shaped hollow, thereby allowing the capacitor element 1 to be fixed securely.

Even when vibrations are imposed on the capacitor thus structured from outside, the structure employed in the present exemplary embodiment makes it possible for the stress created at the junctions between the end surface of the capacitor element 1 and the sealing plate 15 and between the end surface of the capacitor element 1 and the metal case 14 to be reduced.

In addition, according to the foregoing structure, when one of the capacitors is connected in series with another capacitor, for example, the series connection of the capacitors can be achieved by having the anode and cathode flat terminals overlaid one terminal over another terminal and then applying spot welding to the overlaid place, thereby finishing the joining process with a short period when compared with the case where the capacitor terminals are screw joined. When the screw type terminal is adopted in a series connection of the capacitors, a twisting stress is imposed on the sealed part of the capacitor at the time of the series connection, resulting in a danger of causing an adverse effect to the sealing of the capacitor. In contrast, when the flat terminal is employed, no twisting stress is imposed on the sealed part of the capacitor at the time of the series connection, thereby eliminating the danger of causing an adverse effect to the sealing of the capacitor.

Furthermore, when spot welding is applied to two spots on the flat terminal 17a to join two of the terminals 17a together, for example, the existence of a slot on the flat sheet like terminal 17a makes it much easier to perform the welding when compared with the case where no slit is provided on the terminal 17a. Because welding currents also flow through the first welded spot at the time of the second spot welding, is it rather difficult to perform the joining by welding successfully.

When the connection is performed by screwing, the use of the flat terminal 17b with a hole makes the connection process easier. By employing the anodized aluminum part 16b for each respective part where a curling process is applied to the sealing plate 15b and metal case 14b, the insulation between the sealing plate 15b and the metal case 14b can be maintained even after the application of the curling process.

FIG. 3 shows the condition of the through hole 19 for filling an electrolyte before the hole 19 is closed and FIG. 14 shows the condition of the through hole 19 after the hole 19 is closed. When the through hole 19 is shaped like a cylinder protruding from the sealing plate 15 as FIG. 3 shows, for example, the through hole 19 can be closed first by having the cylindrical part deformed by applying a pinch thereto and then by welding the pinched part of the through hole 19 by a laser light irradiation.

Accordingly, any other additional materials are not needed to close the through hole 19, thereby causing no increase of the components and yet enabling the electrolyte to be filled smoothly and the through hole 19 to be closed securely.

When the through hole 19 does not adopt a shape like a cylinder, a flat sheet member for closing the through hole 19 is separately prepared and used to cover the through hole 19. Then, the periphery of the foregoing flat sheet member is joined to the sealing plate 15b by using laser welding, for example, thus enabling the through hole 19 to be closed securely. Since the laser welding is applied to an area appropriately apart from the through hole 19, the electrolyte is prevented from being deposited on the area where the laser welding takes place, thereby eliminating the possibility of causing a failure in joints.

Seventh Exemplary Embodiment

Figure 15:
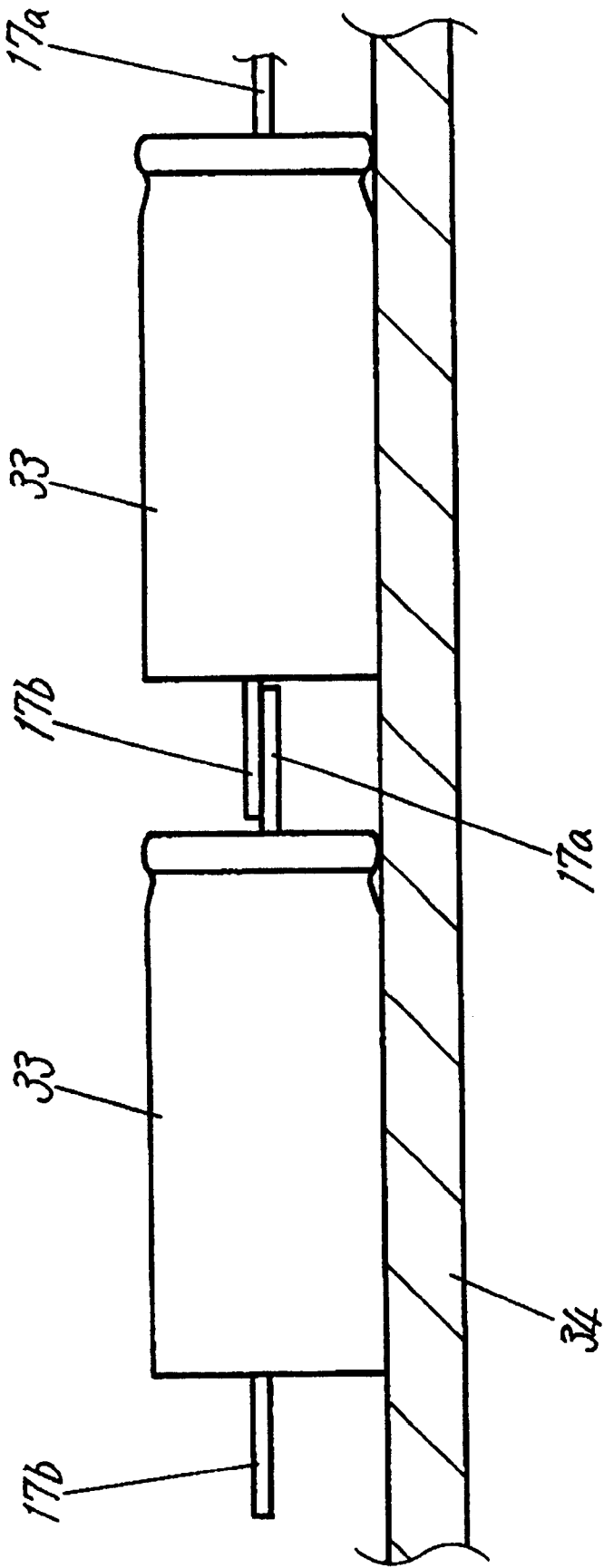
FIG. 15 is a front view of a capacitor in a seventh exemplary embodiment of the present invention.

FIG. 15 is a front view of a capacitor in a seventh exemplary embodiment of the present invention. In FIG. 15, the flat terminals 17a and 17b for external connection of a capacitor 33 are arranged in position off the center axis of the metal case 14b in a direction opposite to each other.

Accordingly, as FIG. 15 shows, when a plurality of capacitors 33 are connected with one another, both terminals 17a and 17b are joined with each other with the center axis of the metal case 14b passing across the boundary surface between both terminals 17a and 17b, and at the same time the capacitor 33 is disposed flat on the upper surface of a substrate 34 and the like without leaving any gaps between the capacitor 33 and the substrate 34, thereby allowing the resonance of the capacitor element 1 to be prevented from taking place and also allowing the high accuracy connections involved with the capacitor 33 to be performed.

Eighth Exemplary Embodiment

Figure 16A:
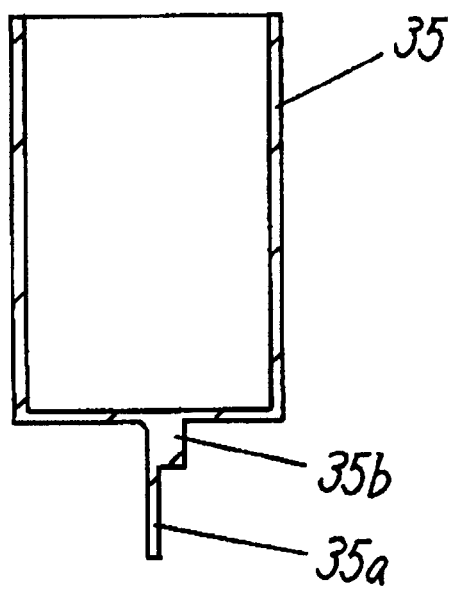
FIG. 16A is a cross-sectional view of a metal case in an eighth exemplary embodiment of the present invention.
Figure 16B:
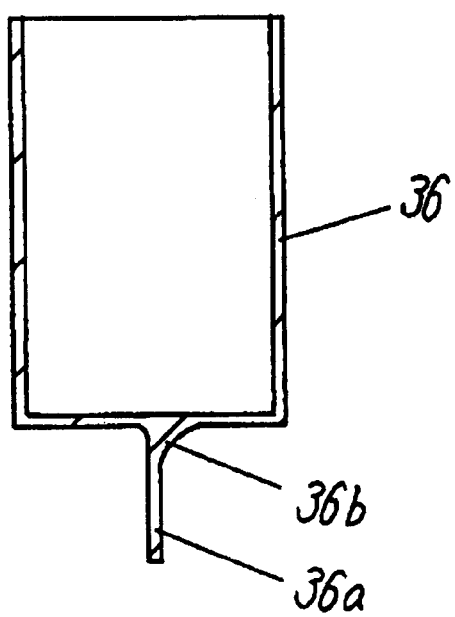
FIG. 16B is a cross-sectional view of another metal case in an eighth exemplary embodiment of the present invention.
Figure 17:
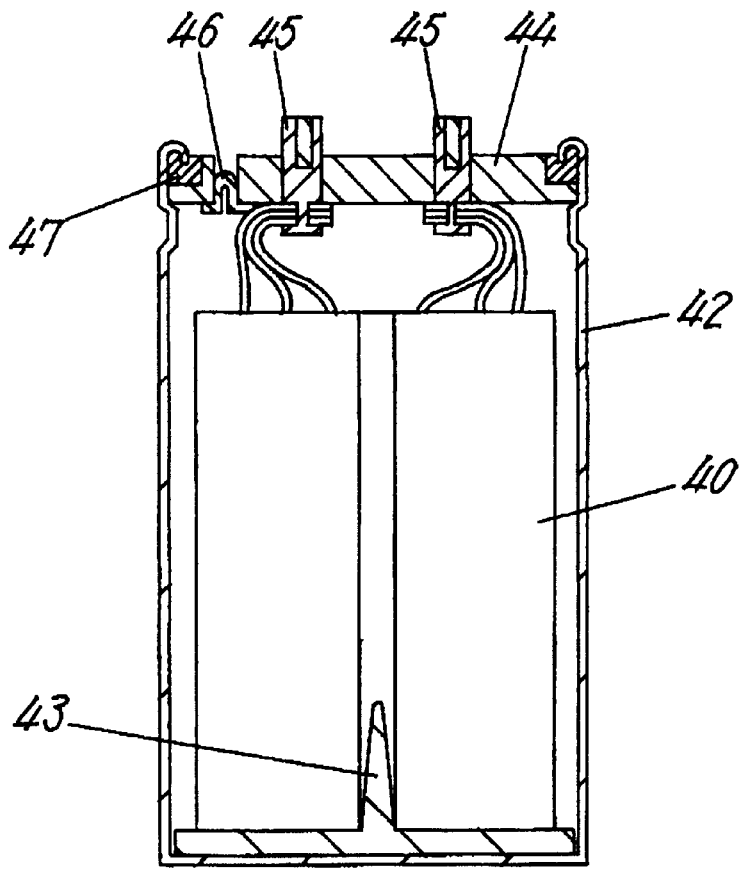
FIG. 17 is a cross-sectional view of a prior art capacitor.
Figure 18:
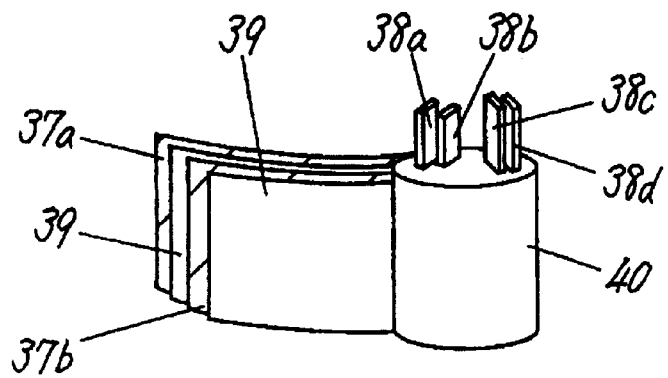
FIG. 18 is an exploded perspective view of a prior art capacitor element.

FIG. 16A and FIG. 16B are cross-sectional views of metal cases, respectively, in an eighth exemplary embodiment of the present invention. As FIG. 16A and FIG. 16B show, the metal cases 35 and 36 according to the present exemplary embodiment have flat terminals 35a and 36a formed integrally therewith, respectively, and the respective flat terminals 35a and 36a have a protrusion 35b and a curvature 36b serving as mechanical reinforcements provided at each respective root thereof to increase the strength of the respective flat terminals 35a and 36a, thereby allowing a capacitor with excellent resistance to vibrations.

More specifically, when vibrations are applied to the capacitor from outside, a stress created at the junction between an end surface of a capacitor eldeet and a sealing plate can be reduced, thereby enabling the capacitor to enhance resistance to vibrations.

As described above, a capacitor of the present invention has a structure, in which two separate electrode connecting members are joined, respectively, with a wound capacitor element at the end surfaces thereof that protrude, respectively, in a direction opposite to each other, thereby enabling an apparent volume resistance of the pair of electrodes to be lowered, the size of the capacitor to be reduced and the number of components of the capacitor to be decreased.

What is claimed is:

1. A capacitor comprising:
    a capacitor element comprising a pair of electrodes with a separator sandwiched therebetween, each end surface of each of said electrodes protruding in directions opposite to each other;
    an electrode connecting member connected with at least one of each end surface of said electrodes by at least one material selected from a group consisting of a plasma-sprayed metal, a welded metal, a solder and a conductive adhesive material;
    a terminal for external connection, which is connected to said electrode connecting member;
    a metal case containing said capacitor element;
    a driving electrolyte held in said capacitor element; and
    a sealing plate to close an opening of said metal case.

2. The capacitor according to claim 1, wherein:
    said metal case is a bottomed cylindrical type;
    at least one metal plate is electrically joined to the end surface of an electrode of said capacitor element; and
    a terminal for external connection, which is joined to said metal plate, is exposed to an outer surface by passing through the sealing plate.

3. The capacitor according to claim 1, wherein:
    said metal case is a bottomed cylindrical type; and
    a terminal for external connection is disposed on an outer surface of said sealing plate.

4. The capacitor according to claim 2, wherein said sealing plate is formed of at least one of a metal and an insulating polymer.

5. The capacitor according to claim 3, wherein said sealing plate is made of one of a metal, a metal and an insulating polymer molded in one piece, and a composite material.

6. The capacitor according to claim 2, wherein said terminal for external connection is of a flat shape.

7. The capacitor according to claim 6, wherein two terminals for external connection are arranged in position off a center axis of the metal case in a direction opposite to each other.

8. The capacitor according to claim 6, wherein said terminal for external connection has one of a slit and a hole.

9. The capacitor according to claim 2, wherein a protrusion is provided on at least one of said metal case, metal plate and sealing plate, positioning and fixing securely the capacitor element.

10. The capacitor according to claim 1, wherein a bar shaped core is disposed in a center of said capacitor element, for positioning and fixing the capacitor element.

11. The capacitor according to claim 10, wherein said bar shaped core is made of at least one of a metal and an insulating polymer.

12. The capacitor according to claim 2, wherein said capacitor element has in a center thereof a bar shaped core provided with a terminal for external connection.

13. The capacitor according to claim 2, wherein a self-returning type pressure adjustment vent is provided on at least one of said sealing plate and said metal case.

14. The capacitor according to claim 13, wherein said pressure adjustment vent comprises:
    a through hole provided on at least one of said sealing plate and said metal case;
    a stopper to cover said through hole; and
    a cap overlaid on said stopper and provided with a hole leading to outside, said cap being imposed with a force in a direction so as to have said through hole always closed by said stopper.

15. The capacitor according to claim 13, wherein said pressure adjustment vent is disposed in said through hole and comprises:
   a vent base provided with a second through hole;
   a stopper to cover said second through hole; and
   a cap overlaid on said stopper and provided with a hole leading to outside, said cap being imposed with a force in a direction so as to have said through hole always closed by said stopper.

16. The capacitor according to claim 9, having a pressure adjustment vent, which comprises:
   a through hole disposed inside of said protrusion;
   a stopper closing said through hole and being disposed inside of said protrusion; and
   a cap overlaid on said stopper and provided with a hole leading to outside, said cap being imposed with a force in a direction to have said through hole always closed by said stopper.

17. The capacitor according to claim 13, wherein said pressure adjustment vent comprises:
   a through hole disposed inside of said protrusion;
   a stopper to cover said through hole and disposed inside of said protrusion; and
   a cap overlaid on said stopper and having a hole connected to outside, said cap being imposed with a force in a direction to have said through hole always closed by said stopper.

18. The capacitor according to claim 14, wherein said through hole is provided with a hollow formed by having part of at least one of said sealing plate and said metal case protruded towards the capacitor element.

19. The capacitor according to claim 13, wherein:
   a through hole leading to a hollow and an inside of the capacitor are provided on one end of a bar shaped core disposed in a center of a hollow capacitor element and intended for at least one of positioning and fixing the capacitor element;
   a stopper disposed in said hollow; and
   a pressure adjustment vent, which is structured so as to impose a force on said stopper in a direction of always closing said stopper by covering said stopper with a sealing plate provided with a through hole leading to outside of the metal case.

20. The capacitor according claim 14, wherein said cap is formed in one piece with the terminal for external connection.

21. The capacitor according claim 14, wherein said stopper is made of a rubber like elastic material.

22. The capacitor according to claim 14, wherein a member to prevent an electrolyte from passing through and to let gas generated inside of the capacitor pass through to outside is disposed closely at least on an area where said through hole is located.

23. The capacitor according to claim 1, wherein said capacitor element is molded with a packaging resin.

24. The capacitor according to claim 1, wherein said pair of electrodes are polarizing electrode layers having a metal oxide film on each respective surface thereof formed, on a current collector, respectively.

25. The capacitor according to claim 24, wherein each of said polarizing electrode is formed of a mixture of active carbon, a binder and a conductive material.

26. The capacitor according claim 1, wherein said separator is one of a functional polymer and a composite material formed of a separator and a functional polymer.

27. The capacitor according claim 2, wherein a through hole for filling an electrolyte is provided on one of said sealing plate and said metal case.

28. The capacitor according claim 27, wherein said through hole is closed by welding.

29. The capacitor according to claim 27, wherein said through hole is closed with a flat member and a periphery of said flat member is joined to at least one of said sealing plate and said metal case.

30. The capacitor according to claim 1, wherein peripheries of said sealing plate and an opening end of said metal case have a layer of one of an insulating material and an anodized layer.

31. The capacitor according to claim 30, wherein said peripheries of the sealing plate and said opening end of the metal case have one of a degreased surface, a roughened surface and an oxide film layer between said insulating material layer and said sealing plate or said metal case.

32. The capacitor according to claim 3, wherein an opening of the metal case and a periphery of the sealing plate are curled together.

33. The capacitor according to claim 30, wherein a configuration of at least one of said sealing plate and an end surface of said metal case has one of a curved surface and a polygon shape.

34. The capacitor according to claim 30, wherein an elastic material is disposed between said sealing plate and said metal case that are subjected to a curling process.

35. The capacitor according to claim 1, wherein said electrode connecting member has a flat surface and said flat surface is formed of an exposed surface of said electrode and a conductive material.

36. The capacitor according to claim 9 wherein:
   the core disposed in the center of the capacitor element has a hollow with a polygonal cross-section; and
   the protrusion formed on one of an inner bottom surface of the metal case, on the sealing plate and on the metal plate is allowed to be fit into the hollow with a polygonal cross-section provided in said core.

37. The capacitor according to claim 2, wherein one of a wave shape and protrusion is formed on at least one selected from a group of said sealing plate, said metal plate and said bottom surface of the metal case.

38. The capacitor according to claim 2, wherein a cylindrical metal case with both ends thereof left open is used in place of the bottomed cylindrical metal case and a sealing plate is disposed on the respective ends of the metal case.

39. The capacitor according to claim 3, wherein one of a wave shape and protrusion is formed on at least one of said sealing plate and said bottom surface of the metal case.

40. The capacitor according to claim 3, wherein said terminal for external connection is a metal plate having one of a slit and a hole.

41. The capacitor according to claim 2, wherein a treatment to enhance an absorption of laser is applied to at least one surface selected from a group of surfaces of said sealing plate, metal sheet and metal case.

42. The capacitor according to claim 2, wherein joining places between said electrode connecting member of the capacitor element and one of said metal plate, metal case and sealing plate are located at positions asymmetrical to one another against a winding axis of the electrodes.

43. The capacitor according to claim 6, wherein one of a reinforcing protrusion and a curvature is provided at a root of said flat terminal.

44. The capacitor according to claim 1, wherein said welded metal comprises a material of said electrodes and one of a material of said case material and a material of said sealing plate.

* * * * *